United States Patent
Park et al.

(10) Patent No.: US 11,345,767 B2
(45) Date of Patent: May 31, 2022

(54) PROPYLENE COPOLYMER RESIN COMPOSITION AND METHOD FOR PREPARING THE SAME

(71) Applicant: LG Chem, Ltd., Seoul (KR)

(72) Inventors: Heekwang Park, Daejeon (KR); Seong Min Chae, Daejeon (KR); Kyung Seop Noh, Daejeon (KR); Sangjin Jeon, Daejeon (KR); Hyunsup Lee, Daejeon (KR); Jihwa Ye, Daejeon (KR)

(73) Assignee: LG Chem, Ltd.

( * ) Notice: Subject to any disclaimer, the term of this patent is extended or adjusted under 35 U.S.C. 154(b) by 1 day.

(21) Appl. No.: 16/960,211

(22) PCT Filed: Oct. 28, 2019

(86) PCT No.: PCT/KR2019/014281
§ 371 (c)(1),
(2) Date: Jul. 6, 2020

(87) PCT Pub. No.: WO2020/096250
PCT Pub. Date: May 14, 2020

(65) Prior Publication Data
US 2021/0061931 A1    Mar. 4, 2021

(30) Foreign Application Priority Data

Nov. 6, 2018   (KR) .................. 10-2018-0135449
Oct. 25, 2019   (KR) .................. 10-2019-0133811

(51) Int. Cl.
| | |
|---|---|
| C08L 23/14 | (2006.01) |
| C08F 210/06 | (2006.01) |
| C08F 4/6592 | (2006.01) |
| C08F 2/02 | (2006.01) |
| C08F 2/28 | (2006.01) |
| C08F 2/44 | (2006.01) |
| C08F 210/02 | (2006.01) |
| C08F 210/08 | (2006.01) |
| C08L 53/00 | (2006.01) |
| D04H 3/16 | (2006.01) |

(52) U.S. Cl.
CPC .............. *C08F 210/06* (2013.01); *C08F 2/02* (2013.01); *C08F 2/28* (2013.01); *C08F 2/44* (2013.01); *C08F 4/65925* (2013.01); *C08F 210/02* (2013.01); *C08F 210/08* (2013.01); *C08L 23/14* (2013.01); *C08L 23/142* (2013.01); *C08L 53/00* (2013.01); *D04H 3/166* (2013.01); *C08L 2203/12* (2013.01); *C08L 2205/02* (2013.01)

(58) Field of Classification Search
CPC .... C08L 23/14; C08L 23/142; C08F 4/65927; C08F 210/06
See application file for complete search history.

(56) References Cited

U.S. PATENT DOCUMENTS

| | | |
|---|---|---|
| 2001/0012562 A1 | 8/2001 | Nakagawa et al. |
| 2003/0055172 A1 | 3/2003 | Kanzaki et al. |
| 2006/0116490 A1 | 6/2006 | Paczkowski et al. |
| 2010/0222517 A1 | 9/2010 | Hino et al. |
| 2015/0031262 A1 | 1/2015 | Henry et al. |
| 2017/0218109 A1 | 8/2017 | Tazumi et al. |

FOREIGN PATENT DOCUMENTS

| | | |
|---|---|---|
| JP | H10338778 A | 12/1998 |
| JP | H11193309 A | 7/1999 |
| JP | H11302474 A | 11/1999 |
| JP | 2000191852 A | 7/2000 |
| JP | 2000191853 A | 7/2000 |
| JP | 2002105833 A | 4/2002 |
| JP | 2003136654 A | 5/2003 |
| JP | 2010037686 A | 2/2010 |
| JP | 2011231328 A | 11/2011 |
| JP | 2016089143 A | 5/2016 |
| KR | 100431575 B1 | 9/2004 |
| KR | 20150006297 A | 1/2015 |
| KR | 20150037654 A | 4/2015 |
| KR | 20150052804 A | 5/2015 |
| KR | 20180040405 A | 4/2018 |
| KR | 20180051222 A | 5/2018 |
| WO | 2015005596 A1 | 1/2015 |

OTHER PUBLICATIONS

International Search Report for Application No. PCT/KR2019/014281 dated Feb. 11, 2020, 2 pages.
Extended European Search Report including Written Opinion for Application No. 19881551.6 dated Jun. 15, 2021, 6 pages.

*Primary Examiner* — Caixia Lu
(74) *Attorney, Agent, or Firm* — Lerner, David, Littenberg, Krumholz & Mentlik, LLP

(57) ABSTRACT

A propylene copolymer resin composition capable of improving softness while maintaining excellent strength properties when preparing nonwoven fabrics, and a method for preparing the same are provided. The propylene copolymer resin composition includes a propylene-ethylene copolymer having an ethylene content of 12 to 18 wt % in the propylene-ethylene copolymer and a propylene-1-butene random copolymer satisfying the following conditions (i) to (iv), wherein (i) 1-butene content of 1 to 5 wt % in the propylene-1-butene random copolymer, (ii) molecular weight distribution of 2.4 or less, (iii) storage modulus of 1200 MPa or less at 25° C., and (iv) phase angle of 5.5° to 8° at a glass transition temperature, and wherein a weight ratio of the propylene-1-butene random copolymer to the propylene-ethylene copolymer is 80:20 to 99:1.

15 Claims, No Drawings

PROPYLENE COPOLYMER RESIN COMPOSITION AND METHOD FOR PREPARING THE SAME

CROSS-REFERENCE TO RELATED APPLICATION(S)

The present application is a national phase entry under 35 U.S.C. § 371 of International Application No. PCT/KR2019/014281 filed Oct. 28, 2019 which claims priority from Korean Patent Application No. 10-2018-0135449 filed in the Korean Intellectual Property Office on Nov. 6, 2018, and Korean Patent Application No. 10-2019-0133811 filed in the Korean Intellectual Property Office on Oct. 25, 2019, the entire contents of which are incorporated herein by reference.

TECHNICAL FIELD

The present disclosure relates to a propylene copolymer resin composition capable of improving softness while maintaining excellent strength properties when preparing nonwoven fabrics, in particular spunbond nonwoven fabrics, and a method for preparing the same.

BACKGROUND ART

Nonwoven fabrics generally include fabrics, felts, resin-bonded nonwoven fabrics, needle punches, spunbonds, spunlaces, embossed films, wet nonwoven fabrics, and the like made by bonding or entangling fiber aggregates mechanically or chemically in the same manner as mechanical treatment or heat bonding, without going through a process of weaving or knitting. Specifically, it means that a randomly overlapping contact point between a web and a fiber is bonded with a resin to be used as a wick. Also known as adhesive fabric, and bonded fabric. The nonwoven fabrics may be prepared by various methods such as a needle punching method, a chemical bonding method, a thermal bonding method, a melt blown method, a spunlace method, a stitch bond method, or a spunbond method.

Meanwhile, spunbond nonwoven fabrics made of polyolefin-based resins are widely used as filters, packaging materials, bedding, clothing, medical supplies, hygiene products, automobile interior materials, building materials, and the like, due to their excellent touch, softness, breathability, and heat insulating properties. In particular, polypropylene short fibers are processed into thermal bond nonwoven fabrics by a calendar bonding method or an air through bonding method due to their characteristic low melting point and excellent chemical resistance, and are mainly used as surface materials for hygiene products such as diapers and sanitary napkins.

Meanwhile, unlike the homo polypropylene resin prepared by a conventional Ziegler-Natta catalyst, a homo polypropylene resin prepared by a metallocene catalyst has a narrow molecular weight distribution, so that a thin and uniform fiber may be produced. Accordingly, there is an advantage of producing excellent nonwoven fabrics with a low basis weight. However, the metallocene homo polypropylene resin has a disadvantage of giving a rough touch (feel) on the surface of nonwoven fabrics, because it has a low content of low molecular weight due to low xylene solubles or narrow molecular weight distribution.

Four techniques are used to give a soft touch to the universal Ziegler-Natta homo polypropylene: a bi-component processing technique using homo polypropylene and polyethylene, a mixing technique using homo polypropylene and propylene-containing polyolefin (C3-POE), a mixing technique using homo polypropylene and low modulus polypropylene (LPP), and a mixing technique using homo polypropylene and polypropylene terpolymer (tPP). However, all of these methods use different kinds of resins in addition to the polypropylene, which improves soft feeling (or softness) compared to the conventional one. However, these methods are limited in increasing the softness, and problems such as lowered strength and reduced productivity are necessarily accompanied.

Accordingly, there is a need for the development of a novel mixed resin composition capable of improving softness while minimizing a decrease in strength, which is a limitation of the prior art.

DETAILED DESCRIPTION OF THE PRESENT DISCLOSURE

Technical Problem

Therefore, the present disclosure is to provide a propylene copolymer resin composition capable of increasing softness while maintaining excellent strength characteristics when preparing nonwoven fabrics by using a propylene-ethylene copolymer, and a propylene-1-butene random copolymer prepared by using a metallocene catalyst having a specific structure with superior butene reactivity compared to the conventional Ziegler-Natta catalyst and controlling the 1-butene content, and a method for preparing the same.

The present disclosure is also to provide a nonwoven fabric, specifically a spunbond or melt blown nonwoven fabric, prepared using the resin composition.

Technical Solution

According to an embodiment of the present disclosure, there is provided a propylene copolymer resin composition including a propylene-1-butene random copolymer satisfying the following conditions (i) to (iv); and a propylene-ethylene copolymer having an ethylene content of 12 to 18 wt % in the copolymer; in a weight ratio of 80:20 to 99:1, (i) 1-butene content in the propylene-1-butene random copolymer: 1 to 5 wt %, (ii) Molecular weight distribution: 2.4 or less, (iii) Storage modulus at 25° C.: 1200 MPa or less, and (iv) Phase angle at a glass transition temperature: 5.5° to 8°.

According to another embodiment of the present disclosure, there is provided a method for preparing the propylene copolymer resin composition, including the steps of:

polymerizing propylene and 1-butene in a weight ratio of 99:1 to 95:5 while introducing 300 to 500 ppm of hydrogen in the presence of a catalyst including a transition metal compound represented by the following Chemical Formula 1 to prepare a propylene-1-butene random copolymer satisfying the conditions (i) to (iv); and mixing the propylene-1-butene random copolymer and a propylene-ethylene copolymer having an ethylene content of 12 to 18 wt % in the copolymer in a weight ratio of 80:20 to 99:1:

[Chemical Formula 1]

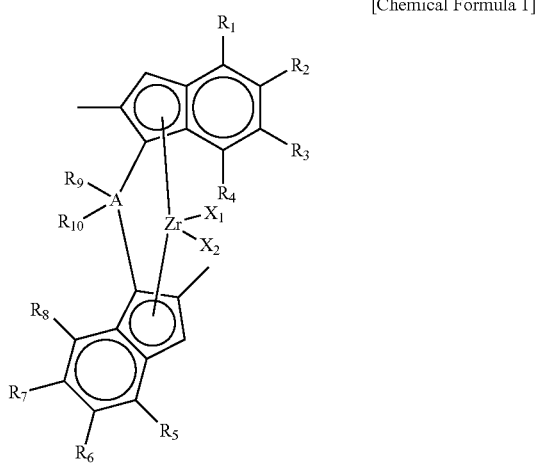

In Chemical Formula 1, the definition of each functional group is as described later.

According to another embodiment of the present disclosure, there is provided a nonwoven fabric prepared using the propylene copolymer resin composition.

Advantageous Effects

The propylene copolymer resin composition according to the present disclosure includes a propylene-1-butene random copolymer having a low storage modulus and a large phase angle at a glass transition temperature with a narrow molecular weight distribution. Therefore, the composition may have improved mechanical properties, in particular, the tensile strength and flexural modulus with a good balance while exhibiting a low melting point and a narrow molecular weight distribution, thereby improving soft feeling or softness while maintaining excellent strength properties in the preparation of nonwoven fabrics, especially spunbond nonwoven fabrics.

DETAILED DESCRIPTION OF THE BEST EMBODIMENTS

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the propylene copolymer resin composition, the method for preparing the same, and the spunbond nonwoven fabric using the same according to the present disclosure will be described in detail.

Specifically, the propylene copolymer resin composition according to an embodiment of the present disclosure includes a) a propylene-1-butene random copolymer satisfying the following conditions (i) to (iv); and b) a propylene-ethylene copolymer having an ethylene content of 12 to 18 wt % in the copolymer; in a weight ratio of 80:20 to 99:1, (i) 1-butene content in the propylene-1-butene random copolymer: 1 to 5 wt % based on a total weight of the propylene-1-butene random copolymer, (ii) Molecular weight distribution: 2.4 or less, (iii) Storage modulus at 25° C.: 1200 MPa or less, and (iv) Phase angle at a glass transition temperature: 5.5° to 8°.

In general, the metallocene homo polypropylene resin used for the preparation of nonwoven fabrics has a problem of giving a rough touch when preparing nonwoven fabrics due to low xylene solubles or a low content of low molecular weight structure by the narrow molecular weight distribution. In addition, in the case of preparing nonwoven fabrics using random polypropylene instead of homo polypropylene, there is a problem that heterogeneous comonomers (for example, ethylene) enter between main chains and deform a lamellar structure of the resin, thereby increasing softness but lowering strength.

Thus, the present disclosure uses a propylene-1-butene random copolymer using an alpha-olefin, 1-butene, as a comonomer together with a propylene-ethylene copolymer capable of increasing softness by optimizing the ethylene content in the preparation of the polypropylene resin composition. Accordingly, it is possible to prevent the decrease in strength while increasing the softness by changing the lamellar structure due to the use of different comonomers. Furthermore, the above effects can be further increased by optimizing the mixing ratio of the propylene-ethylene copolymer and the propylene-1-butene random copolymer.

In addition, the propylene-1-butene random copolymer used in the present disclosure includes 1-butene in an optimum content by using a metallocene catalyst having a specific structure with superior butylene reactivity compared to the conventional Ziegler-Natta catalyst, and controlling the polymerization conditions at the same time. Therefore, the copolymer realizes a narrow molecular weight distribution at a high conversion rate even in the random polymerization, and may prepare a high-strength high-softness nonwoven fabric with excellent fiber processability.

Specifically, the 1-butene content in the propylene-1-butene random copolymer of i) may be 1 wt % or more, 1.5 wt % or more, 2 wt % or more, or 2.3 wt % or more, and 5 wt % or less, 3.5 wt % or less, 3 wt % or less, or 2.6 wt % or less. Herein, the 1-butene content should be 1 wt % or more for softness, and should be 5 wt % or less in order for the resin to have a melting point which is required to be produced in a bulk polymerization process.

In the present disclosure, the 1-butene content in the propylene-1-butene random copolymer may be determined by the following method in accordance with ASTM D 5576: The polymer is prepared in the form of a film or film specimen, and then fixed on a magnetic holder of an FT-IR instrument. Next, an IR absorption spectrum analysis is performed to measure a height of 4800-3500 $cm^{-1}$ peak related to the specimen thickness and an area of 790-660 $cm^{-1}$ peak where 1-butene component appears. Thereafter, the 1-butene content is calculated by substituting the values measured above into a calibration equation obtained by plotting values obtained by dividing an area of 790-660 cm$^{-1}$ peak by a height of 4800-3500 cm$^{-1}$ peak of a standard sample according to ASTM D 5576.

Fiber processability means that fibers are produced in the long term and continuously without the occurrence of single yarns in the spinning process, or finer fibers with higher strength are produced by allowing stretching at high magnification in the stretching process due to a uniform molecular weight distribution.

The propylene-1-butene random copolymer according to an embodiment of the present disclosure has a narrow molecular weight distribution (MWD) of 2.4 or less while satisfying the above 1-butene content due to its characteristic preparation method. By having the narrow molecular weight distribution, excellent fiber processability may be ensured. More specifically, the molecular weight distribution may be 2.35 or less, or 2.3 or less, and 2.0 or more, or 2.1 or more.

In the present disclosure, the molecular weight distribution of the propylene-1-butene random copolymer may be determined by measuring the weight average molecular weight (Mw) and the number average molecular weight (Mn) using gel permeation chromatography (GPC), and then dividing the weight average molecular weight by the number average molecular weight (MWD=Mw/Mn). Specifically, it was measured using a Polymer Laboratories PLgel MIX-B 300 mm long column and PL-GPC220 instrument manufactured by Waters. At this time, a measurement temperature was 160° C., and 1,2,4-trichlorobenzene was used for a solvent at a flow rate of 1 mL/min. And the polymer sample was supplied with a concentration of 10 mg/10 mL in an amount of 200 μL. Mw and Mn were obtained using a calibration curve formed using a polystyrene standard. 9 kinds of the polystyrene standard were used with the molecular weight of 2,000 g/mol, 10,000 g/mol, 30,000 g/mol, 70,000 g/mol, 200,000 g/mol, 700,000 g/mol, 2,000,000 g/mol, 4,000,000 g/mol, and 10,000,000 g/mol.

In addition, the propylene-1-butene random copolymer has a low storage modulus (G'@ 25° C., Mpa), thereby exhibiting excellent softness. As a result, it can be useful for the preparation of softer fibers or nonwoven fabrics as compared to conventional hard and stiff homo polypropylenes. Specifically, the propylene-1-butene random copolymer may have a storage modulus at 25° C. of 1200 Mpa or less, or 1190 Mpa or less, and 850 Mpa or more, 880 Mpa or more, or 1000 Mpa or more. When having the storage modulus within the above-described range, the nonwoven fabric to be prepared may have excellent softness without a fear of tearing due to the decrease in strength.

The storage modulus of the propylene-1-butene random copolymer can be measured using an ARS rheometer. At this time, a sample for measurement is prepared to have a gap of 2.0 mm using parallel plates having a diameter of 25.0 mm at 190° C. The measurement is performed at 25° C. in the dynamic strain frequency sweep mode, at a 5% stain and a frequency ranged from 0.05 rad/s to 500 rad/s, a total of 41 points, 10 points in each decade. And a storage modulus at 0.05 rad/s is measured. Herein, the power law fitting is performed using TA Orchestrator, a measuring program.

In addition, the propylene-1-butene random copolymer has a higher phase angle at a glass transition temperature (Tg) compared to the conventional homo polypropylene, thereby showing excellent softness, and as a result, it is possible to prepare soft fibers or nonwoven fabrics.

The higher the phase angle at Tg, the more moving parts at Tg, that is, the more chains. Mainly at Tg, the chains in the amorphous region react, so the higher the value, the lower the crystallinity and the greater the modulus reduction. Specifically, the propylene copolymer resin composition may have a phase angle measured at a glass transition temperature of 5.5° or more, 5.8° or more, or 6° or more, and 8° or less, 7.8° or less, or 7.6° or less.

In addition, the phase angle of the propylene-1-butene random copolymer is determined by measuring a loss modulus (E") and a storage modulus (E') using a dynamic mechanical analysis (DMA), and obtaining a ratio of E"/E'. Specifically, an injection specimen of width 12.7 mm, thickness 3.2 mm, and length 40 mm or more is subjected to repeated deformation under the conditions of frequency 1 Hz and strain 0.1% while increasing the temperature from −30° C. to 150° C. at 5° C./min using 3 Point Bending Geometry, and a change in E" and E' is measured.

Furthermore, the propylene-1-butene random copolymer has a melt index (MI) of 10 g/10 min to 40 g/10 min when measured at 230° C. under a load of 2.16 kg in accordance with ASTM D 1238. When the melt index of the propylene-1-butene random copolymer is less than 10 g/10 min, it is difficult to maintain the molecular weight required to be processed into a nonwoven fabric, and when it exceeds 40 g/10 min, it is difficult to maintain the basic strength of the nonwoven fabric. Specifically, the melt index may be 12 g/10 min or more, or 15 g/10 min or more, and 40 g/10 min or less, 38 g/10 min or less, or 35 g/10 min or less.

In the present disclosure, the melt index of the propylene-1-butene random copolymer may be measured at 230° C. under a load of 2.16 kg in accordance with ASTM D1238, and expressed as the weight (g) of the polymer that has been melted for 10 minutes.

In addition, the propylene-1-butene random copolymer may have an optimized melting point (Tm) with the physical properties described above. The melting point (Tm) of the copolymer may be 150° C. or less to satisfy the minimum 1-butene (C4) content of 1 wt % for producing a high-strength high-softness nonwoven fabric. However, the melting point (Tm) of the propylene-1-butene random copolymer may be 140° C. or more in order to secure a desirable resin form for producing the nonwoven fabric. Specifically, the melting point (Tm) of the propylene-butene copolymer may be 150° C. or less, or 145° C. or less, and 140° C. or more, or 141° C. or more.

In the present disclosure, the melting point (Tm) of the polymer may be measured using differential scanning calorimeter (DSC). Specifically, the temperature of the polymer sample is increased to 200° C., and maintained at that temperature for 5 minutes. After that, the temperature is lowered to 30° C., and further increased. The temperature at the top of the DSC curve is referred to as the melting point. Herein, the temperature is increased and lowered at a rate of 10° C./min, respectively, and the melting point is confirmed at the second heating period.

The propylene-1-butene random copolymer having the above-described physical properties may be prepared by polymerizing propylene and 1-butene while introducing hydrogen in the presence of a catalyst including a transition metal compound having a structure described below. At this time, the above-described physical properties can be achieved by controlling the type of catalyst, the input of hydrogen and the 1-butene content.

Meanwhile, the resin composition according to an embodiment of the present disclosure includes a propylene-ethylene copolymer together with the above propylene-1-butene random copolymer.

The propylene-ethylene copolymer may improve softness of the resin composition, and this effect can be increased by controlling the ethylene content in the propylene-ethylene copolymer. Specifically, the ethylene content in the propylene-ethylene copolymer may be 12 to 18 wt %. When the ethylene content is less than 12 wt %, it is difficult to provide sufficient softness. When the ethylene content is more than 18 wt %, compatibility with the propylene-1-butene random copolymer may be lowered, thereby lowering strength characteristics. Accordingly, when within the above range, it is possible to maintain excellent strength characteristics while improving softness. More specifically, the ethylene content in the propylene-ethylene copolymer may be 15 wt % or more and 18 wt % or less.

In the present disclosure, the ethylene content in the propylene-ethylene copolymer may be measured in the same manner as in the case of measuring the 1-butene content in the propylene-1-butene random copolymer, except for measuring an area of 760-710 cm$^{-1}$ peak where ethylene component appears.

In addition, the propylene-ethylene copolymer may be a block copolymer that meets the above ethylene content. The propylene-ethylene random copolymer is difficult to include the ethylene at a high content, and when the ethylene content is 5 wt % or more, the resin is present in a liquid phase.

The propylene copolymer resin composition according to an embodiment of the present disclosure includes the propylene-1-butene random copolymer and the propylene-ethylene copolymer in a weight ratio of 80:20 to 99:1. When including them within the above range, it can exhibit significantly improved softness while maintaining excellent strength properties.

Considering the remarkable improvement effect of the mixing ratio control, the resin composition may include the propylene-1-butene random copolymer and the propylene-ethylene copolymer in a weight ratio 82:18 or more, or 85:15 or more, and 95:5 or less or 90:10 or less ('or more' and 'or less' in the weight ratio are based on the propylene-1-butene random copolymer).

In addition, the propylene copolymer resin composition according to an embodiment of the present disclosure may further include an additive for improving physical properties required according to the use of the resin composition, in addition to the above propylene-1-butene random copolymer and propylene-ethylene copolymer. Specifically, the composition may include at least one additive such as a nucleating agent (for example, benzylidene sorbitol, methylbenzylidene sorbitol, ethylbenzylidene sorbitol, etc.), an antioxidant (tetrakis(methylene (3,5-di-t-butyl-4-hydroxyhydrocinnamate), tris(2,4-di-t-butylphenol)phosphite, etc.), a catalytic neutralizer (calcium stearate, hydrotalcite, etc.), a pigment, a dispersant, a weather resistance enhancer, an antistatic agent, a UV stabilizer, a slip agent, an antiblocking agent, talc, or an MI enhancer (bis(t-butylperoxyisopropyl) benzene, etc.). A content of the additive may be appropriately adjusted within a range not inhibiting the object of the present disclosure. Specifically, the additive may be included in 0.01 to 5 wt % based on a total weight of the resin composition.

The propylene copolymer resin composition according to an embodiment of the present disclosure having the composition described above has a low melting point and a narrow molecular weight distribution, compared to a resin composition including the conventional homo polypropylene instead of the propylene-1-butene random copolymer.

Specifically, the melting point (Tm) of the propylene copolymer resin composition may be 150° C. or less, or 145° C. or less, and 140° C. or more, or 141° C. or more. With such a low melting point, excellent processability may be exhibited. As a result, it is possible to lower the temperature at the time of melting the resin in the preparation of nonwoven fabrics, and to reduce production cost and energy because bonding is possible at a low temperature even in the bonding process of the nonwoven fabric.

Meanwhile, the melting point of the propylene copolymer resin composition may be measured using a differential scanning calorimeter (DSC) in the same manner as described above for the propylene-1-butene random copolymer.

In addition, the propylene copolymer resin composition may have a molecular weight distribution of 2.3 or less, and 2.0 or more, or 2.1 or more. When exhibiting such a narrow molecular weight distribution, it is possible to further stretch without causing a breakage in the stretching process of the nonwoven fabric, and as a result, it is possible to manufacture high-strength fibers and nonwoven fabrics.

The molecular weight distribution (MWD) of the propylene copolymer resin composition may be also determined in the same manner as described for the propylene-1-butene random copolymer, by measuring the weight average molecular weight (Mw) and the number average molecular weight (Mn) using gel permeation chromatography (GPC), and then dividing the weight average molecular weight by the number average molecular weight. Herein, the measuring conditions are the same as described above.

In addition, the propylene copolymer resin composition exhibits excellent mechanical properties. Specifically, the composition may have a tensile strength of 100 kg/cm$^2$ or more, or 140 kg/cm$^2$ or more, and 300 kg/cm$^2$ or less, or 290 kg/cm$^2$ or less, and a flexural modulus of 9,000 kg/cm$^2$ or more, or 9400 kg/cm$^2$ or more, and 12,000 kg/cm$^2$ or less, or 11,500 kg/cm$^2$ or less. With such improved mechanical properties, in particular, the tensile strength and flexural modulus are improved with a good balance, thereby improving softness while maintaining excellent strength properties in the preparation of nonwoven fabrics, especially spunbond nonwoven fabrics.

In the present disclosure, the tensile strength of the propylene copolymer resin composition may be measured after forming a film of the resin composition according to ASTM D882. For example, the film of the resin composition for measuring the tensile strength may be prepared according to the following conditions.

<Film Forming Conditions>

Screw rpm: 40 rpm,

Processing temperature: 170° C.,

Die gap: 2.5 mm, Dies: 100 mm.

In addition, the flexural modulus of the propylene copolymer resin composition may be measured in accordance with ASTM D790. Specifically, after the specimen prepared in accordance with ASTM D790 is fixed to a support, the strength required when a load is applied at approximately 30 to 50 mm/min by loading nose is measured. The flexural modulus indicating stiffness may be measured by an initial slope value according to the flexural strength, a maximum value at which the loading nose no longer increases, and the flexural force.

The propylene copolymer resin composition according to an embodiment of the present disclosure having the above structural and physical characteristics may be prepared by a method including:

a first step of polymerizing propylene and 1-butene in a weight ratio of 99:1 to 95:5 while introducing 300 to 500 ppm of hydrogen in the presence of a catalyst including a transition metal compound represented by the following Chemical Formula 1 to prepare a propylene-1-butene random copolymer satisfying the conditions (i) to (iv); and a second step of mixing the propylene-1-butene random copolymer and a propylene-ethylene copolymer having an ethylene content of 12 to 18 wt % in the copolymer in a weight ratio of 80:20 to 99:1. According to another embodiment of the present disclosure, there is provided a method for preparing the propylene copolymer resin composition:

[Chemical Formula 1]

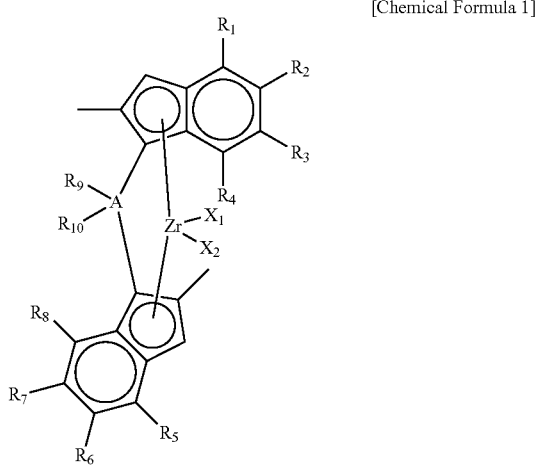

In Chemical Formula 1,

A is carbon, silicon or germanium, $X_1$ and $X_2$ are each independently halogen, $R_1$ and $R_5$ are each independently $C_{6-20}$ aryl substituted with $C_{1-20}$ alkyl, $R_2$ to $R_4$ and $R_6$ to $R_8$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl, $R_9$ is $C_{1-20}$ alkyl, and $R_{10}$ is $C_{2-20}$ alkyl.

Unless otherwise specified herein, following terms may be defined as follows.

The halogen may be fluorine (F), chlorine (Cl), bromine (Br) or iodine (I).

The $C_{1-20}$ alkyl group may be a linear, branched or cyclic alkyl group. Specifically, the $C_{1-20}$ alkyl group may be a $C_{1-15}$ linear alkyl group; a $C_{1-10}$ linear alkyl group; a $C_{1-5}$ linear alkyl group; a $C_{3-20}$ branched or cyclic alkyl group; a $C_{3-15}$ branched or cyclic alkyl group; or a $C_{3-10}$ branched or cyclic alkyl group. More specifically, the $C_{1-20}$ alkyl group may be a methyl group, an ethyl group, an n-propyl group, an iso-propyl group, an n-butyl group, an iso-butyl group, a tert-butyl group, an n-pentyl group, an iso-pentyl group, a neo-pentyl group, a cyclohexyl group or the like.

The $C_{2-20}$ alkenyl group may be a linear, branched, or cyclic alkenyl group. Specifically, the $C_{2-20}$ alkenyl group may be a $C_{2-20}$ linear alkenyl group, a $C_{2-10}$ linear alkenyl group, a $C_{2-5}$ linear alkenyl group, a $C_{3-20}$ branched alkenyl group, a $C_{3-15}$ branched alkenyl group, a $C_{3-10}$ branched alkenyl group, a $C_{5-20}$ cyclic alkenyl group, or a $C_{5-10}$ cyclic alkenyl group. More specifically, the $C_{2-20}$ alkenyl group may be an ethenyl group, a propenyl group, a butenyl group, a pentenyl group, a cyclohexenyl group, or the like.

The $C_{6-30}$ aryl may be a monocyclic, bicyclic or tricyclic aromatic hydrocarbon. Specifically, the $C_{6-30}$ aryl may be phenyl, naphthyl, anthracenyl, or the like.

The $C_{7-30}$ alkylaryl may include a substituent in which at least one hydrogen of the aryl is substituted with alkyl.

Specifically, the $C_{7-30}$ alkylaryl may be methylphenyl, ethylphenyl, n-propylphenyl, iso-propylphenyl, n-butylphenyl, iso-butylphenyl, tert-butylphenyl, cyclohexylphenyl, or the like.

The $C_{7-30}$ arylalkyl may include a substituent in which at least one hydrogen of the alkyl is substituted with aryl. Specifically, the $C_{7-30}$ arylalkyl may be benzyl, phenylpropyl or phenylhexyl.

In method for preparing the propylene copolymer resin composition according to an embodiment of the present disclosure, the first step is a step of preparing a propylene-1-butene random copolymer.

The first step may be performed by polymerizing propylene and 1-butene in a weight ratio of 99:1 to 95:5 while introducing 300 to 500 ppm of hydrogen in the presence of a catalyst including a transition metal compound represented by the following Chemical Formula 1, and a propylene-1-butene random copolymer having the physical properties of (i) to (iv) described above, such that a 1-butene content in the copolymer is 1 to 5 wt %, a molecular weight distribution is 2.4 or less, and the like, is prepared.

In the first step, the catalyst includes the compound of Chemical Formula 1 as a single catalyst. Accordingly, the molecular weight distribution of the propylene-1-butene random copolymer to be prepared may be significantly narrowed compared to the case where a mixture of two or more catalysts is used.

Moreover, the compound of Chemical Formula 1 includes a divalent functional group A substituted with two alkyl groups as a bridge group connecting two ligands including an indenyl group. As the atomic size is larger than that of the existing carbon bridge, the available angle is increased and monomers are easily accessed, thereby exhibiting excellent catalytic activity.

In addition, both of the two indenyl groups, which is the ligands, are substituted with a methyl group at position 2, and substituted with an alkyl-substituted aryl group, specifically a phenyl group, at position 4 ($R_1$ and $R_5$). Thus, it is possible to exhibit better catalytic activity due to an inductive effect capable of providing sufficient electrons.

In addition, the compound of Chemical Formula 1 includes zirconium (Zr) as a central metal, thereby having more orbitals capable of accepting electrons as compared to the transition metal compound containing another group 4 transition metal such as Hf. Thus, it can bind to monomers with higher affinity, resulting in much improved catalytic activity.

More specifically, in Chemical Formula 1, $R_1$ and $R_5$ may each independently be a $C_{6-12}$ aryl group substituted with $C_{1-10}$ alkyl, and more specifically, a phenyl group substituted with a $C_{3-6}$ branched alkyl group such as tert-butyl phenyl. In addition, the substitution position of the alkyl group with respect to the phenyl group may be a position 4 corresponding to a para-position with respect to $R_1$ or $R_5$ bonded to the indenyl group.

In Chemical Formula 1, $R_2$ to $R_4$ and $R_6$ to $R_8$ may each independently be hydrogen, and $X_1$ and $X_2$ may each independently be chloro.

In addition, in Chemical Formula 1, A, which is a bridge group, may be silicon, $R_9$, which is a substituent of A, may be $C_{1-10}$ linear alkyl, $R_{10}$ may be $C_{2-10}$ linear alkyl, and $R_9$ and $R_{10}$ may be the same as or different from each other.

More specifically, when $R_9$ and $R_{10}$ are different from each other, $R_9$ may be $C_{1-2}$ alkyl such as a methyl group, and $R_{10}$ may be a linear alkyl group having a different chain length, which is $C_{3-10}$ linear alkyl such as a normal-propyl group. More specifically, $R_9$ may be a methyl group, and $R_{10}$ may be a normal-propyl group. When linear alkyl groups having different chain lengths are introduced into the bridge, catalytic activity with excellent supporting reactivity may be exhibited.

When $R_9$ and $R_{10}$ are the same as each other, $R_9$ and $R_{10}$ may be any one of a $C_{2-10}$ linear alkyl group, or more specifically, any one of a $C_{2-4}$ linear alkyl group. Even more specifically, each of $R_9$ and $R_{10}$ may be ethyl. When using linear alkyl groups having the same chain length with each other, it is possible to improve supporting efficiency by increasing solubility of the compound with excellent catalytic activity.

When the substituents $R_9$ and $R_{10}$ of A are methyl groups, there is a problem of low catalytic activity and poor solubility in preparing a supported catalyst, resulting in poor supporting reactivity. Further, when any one of the substituents $R_9$ and $R_{10}$ of A is an alkoxyalkyl group, due to the structural difference in which catalytic reaction sites are bulky, the propylene-butene copolymer to be prepared has a relatively high melt index, a low weight average molecular weight and a wide molecular weight distribution (MWD), and as a result, processability and mechanical strength characteristics of the nonwoven fabric may be lowered.

More specifically, representative examples of the compound represented by the Chemical Formula 1 are as follows:

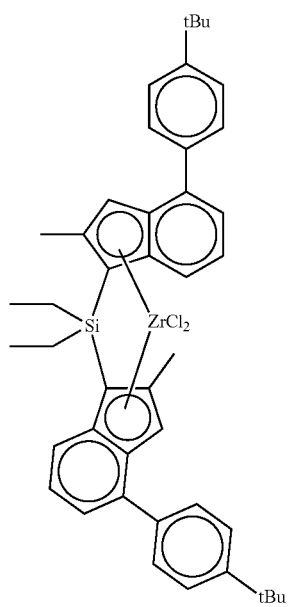

(1a)

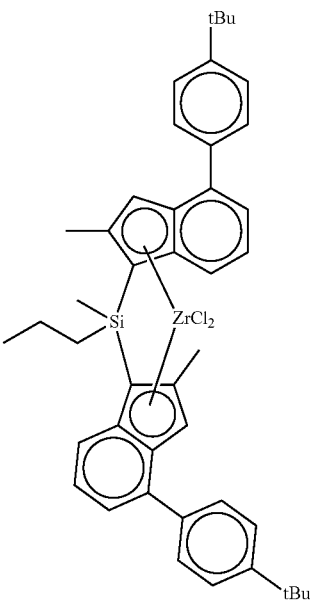

(1b)

The compound of Chemical Formula 1 may be synthesized by applying known reactions, and a detailed synthesis method may be referred to Preparation Examples.

Further, the compound of Chemical Formula 1 may be used as a single component or in the form of a supported catalyst supported on a support.

When used in the form of a supported catalyst, the polymer to be prepared has excellent particle shape and bulk density, and it may be suitably used for slurry polymerization, bulk polymerization, or gas phase polymerization.

A support containing hydroxyl groups or siloxane groups on its surface may be used as the support. Preferably, a support containing highly reactive hydroxyl groups and siloxane groups which is dried at a high temperature to remove moisture on the surface may be used. The support may be silica, alumina, magnesia, silica-alumina, or silica-magnesia, and commonly contain oxide, carbonate, sulfate, and nitrate such as $Na_2O$, $K_2CO_3$, $BaSO_4$, $Mg(NO_3)_2$, and the like. In the case of silica, since the functional group of the silica support and the metallocene compound are chemically bonded and supported, there are almost no catalysts liberated from the surface of the support in the propylene polymerization process. As a result, when preparing polypropylene by slurry or gas phase polymerization, a fouling phenomenon, sticking to the wall surface of the reactor or with each other, may be minimized.

When the compound of Chemical Formula 1 is supported on a support and the support is silica, the compound of Chemical Formula 1 may be supported in 40 μmol or more, or 80 μmol or more, and 240 μmol or less, or 160 μmol or less based on 1 g of silica. When supported within the above range, the supported catalyst may exhibit appropriate activity, which is advantageous in terms of maintaining catalytic activity and economical efficiency.

In addition, the above catalyst composition may further include a cocatalyst in terms of improving the activity and stability.

The cocatalyst may include at least one compound selected from the compound represented by the following Chemical Formula 2, the compound represented by the Chemical Formula 3 and the compound represented by the Chemical Formula 4:

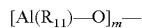 [Chemical Formula 2]

in Chemical Formula 2, $R_{11}$ are the same as or different from each other, and each independently halogen; a $C_{1-20}$ hydrocarbon; or a $C_{1-20}$ halogen-substituted $C_{1-20}$ hydrocarbon; and m is an integer of 2 or more;

 [Chemical Formula 3]

in Chemical Formula 3, $R_{12}$ are the same as or different from each other, and each independently halogen; a $C_{1-20}$ hydrocarbon; or a $C_{1-20}$ halogen-substituted $C_{1-20}$ hydrocarbon; and J is aluminum or boron;

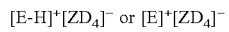 [Chemical Formula 4]

in Chemical Formula 4,

E is a neutral or cationic Lewis base;

H is a hydrogen atom;

Z is a Group 13 element; and

D are the same as or different from each other, and each independently a $C_{6-20}$ aryl or $C_{1-20}$ alkyl group, of which one or more hydrogen atoms are substituted or unsubstituted with halogen, a $C_{1-20}$ hydrocarbon, alkoxy, or phenoxy.

Examples of the compound represented by Chemical Formula 2 may include an alkylaluminoxane-based compound such as methylaluminoxane, ethylaluminoxane, isobutylaluminoxane, butylaluminoxane, and the like, and any one or a mixture thereof may be used.

Examples of the compound represented by Chemical Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and the like, and any one or a mixture thereof may be used. More specifically, at least one compound selected from the group consisting of trimethylaluminum, triethylaluminum, and triisobutylaluminum may be used.

Examples of the compound represented by Chemical Formula 4 may include triethylammonium tetraphenylboron, tributylammonium tetraphenylboron, trimethylammonium tetraphenylboron, tripropylammonium tetraphenylboron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, triphenylphosphonium tetraphenylaluminum, trimethylphosphonium tetraphenylaluminum, tripropylammonium tetra(p-tolyl)boron, triethylammonium tetra(o,p-dimethylphenyl)boron, tributylammonium tetra(p-trifluoromethylphenyl)boron, triphenylcarbonium tetra(p-trifluoromethylphenyl)boron, triphenylcarbonium tetrapentafluorophenylboron, and the like, and any one or a mixture thereof may be used.

More specifically, the cocatalyst may be an alkylaluminoxane-based cocatalyst of Chemical Formula 2.

The alkylaluminoxane-based cocatalyst stabilizes the transition metal compound of Chemical Formula 1 and also acts as a Lewis acid. Therefore, catalytic activity may be further enhanced by including a metal element capable of forming a bond through a Lewis acid-base interaction with a functional group introduced into the bridge group of the transition metal compound of Chemical Formula 1.

In addition, a content of the cocatalyst may be appropriately adjusted depending on the properties or effects of the desired catalyst and the resin composition. For example, when silica is used as the support, the cocatalyst may be supported in an amount of 8 mmol or more, or 10 mmol or more, and 25 mmol or less, or 20 mmol or less based on a weight of the support, for example, 1 g of silica.

The catalyst composition having the above-described composition may be prepared by a preparation method including the steps of supporting a cocatalyst compound on a support, and supporting the compound represented by the Chemical Formula 1 on the support, wherein the supporting order of the cocatalyst and the compound of Chemical Formula 1 may be changed, if necessary. However, considering the effect of the supported catalyst having a structure determined depending on the supporting order on the catalytic activity and process stability in the preparation of polypropylene, it is preferable to support the compound of Chemical Formula 1 after the cocatalyst for higher catalytic activity and excellent process stability.

Meanwhile, the polymerization reaction for preparing the propylene-1-butene random copolymer may be performed by contacting a catalyst including the transition metal compound of Chemical Formula 1 with propylene monomers and 1-butene monomers.

Herein, the propylene and 1-butene may be used in a weight ratio of 99:1 to 95:5, 99:1 to 93:7, 99:1 to 96:4, or 98.5:1.5 to 97:3. The weight ratio of 1-butene in the polymerization process should be 99:1 or more in terms of softness, and 95:5 or less for controlling a butene content and Tm of the copolymer to be prepared, and thus controlling the phase angle and storage modulus.

In addition, the polymerization reaction for preparing the propylene-1-butene random copolymer may be carried out by a continuous polymerization process. For example, various polymerization processes known as the polymerization of olefinic monomers such as a continuous solution polymerization process, a bulk polymerization process, a suspension polymerization process, a slurry polymerization process or an emulsion polymerization process may be applied. Particularly, a bulk-slurry polymerization process is preferable in order to obtain a uniform molecular weight distribution and to produce commercial products.

The polymerization reaction may be performed at a temperature of 40° C. or higher, 60° C. or higher, or 70° C. or higher, and 110° C. or lower, or 100° C. or lower, and under a pressure of 1 bar or higher, or 30 bar or higher, and 100 bar or lower, or 50 bar or lower.

In addition, the polymerization reaction is performed while introducing hydrogen gas.

The hydrogen gas functions to activate inert sites of the metallocene catalyst and to control the molecular weight by causing a chain transfer reaction. The compound of Chemical Formula 1 used in the present disclosure has excellent reactivity with hydrogen, and thus, a polymer having a desired molecular weight and melt index may be effectively obtained by controlling the amount of hydrogen gas used in the polymerization process.

The input amount of the hydrogen gas may be appropriately adjusted depending on the catalyst. Specifically, the hydrogen gas may be introduced in an amount of 300 ppm or more and 500 ppm or less based on a total weight of the propylene monomer. By adjusting the amount of the hydrogen gas used, it is possible to control the molecular weight distribution and fluidity of the copolymer to be prepared while exhibiting sufficient catalytic activity, thereby preparing a copolymer having suitable physical properties according to the application. More specifically, the compound of Chemical Formula 1 has very good reactivity with hydrogen. Thus, increasing the amount of hydrogen gas activates the chain transfer reaction, thereby obtaining a copolymer having a reduced molecular weight and a high melt index. More specifically, the hydrogen gas may be introduced in 300 ppm or more, or 310 ppm or more, and 500 ppm or less, or 480 ppm or less.

In addition, trialkylaluminum such as triethylaluminum may be selectively added during the polymerization reaction.

When moisture or impurities are present in the polymerization reactor, a part of the catalyst decomposes. Since the trialkylaluminum acts as a scavenger which preliminarily captures moisture or impurities present in the reactor, activity of the catalyst may be maximized, and as a result, a propylene-1-butene random copolymer satisfying the above physical properties may be prepared more efficiently. Specifically, alkyl of the above-mentioned trialkylaluminum is as defined above, and may be $C_{1-20}$ alkyl, more specifically $C_{1-6}$ linear alkyl such as methyl, ethyl and the like.

The trialkylaluminum (based on 1M) may be added in an amount of 0.01 ml or more, 0.1 ml or more, or 0.3 ml or more, and 20 ml or less, or 10 ml or less, based on a total weight of the monomer for preparing the propylene-1-butene random copolymer. A propylene-1-butene random copolymer having the desired physical properties may be more easily prepared when performing the polymerization reaction in the presence of trialkylaluminum within the above-mentioned range.

In the polymerization reaction, the catalyst may be used dissolved or diluted in a solvent. The solvent may be an aliphatic hydrocarbon solvent having 5 to 12 carbon atoms such as pentane, hexane, heptane, nonane, decane, and an isomer thereof, an aromatic hydrocarbon solvent such as toluene, and benzene, or a hydrocarbon solvent substituted with chlorine such as dichloromethane, and chlorobenzene, which is suitable for the polymerization of propylene monomers. At this time, a small amount of water or air, which can act as a catalyst poison, may be removed by treating the solvent with a small amount of alkylaluminum in advance.

In the method for preparing the propylene-1-butene random copolymer, productivity may be improved at a high conversion rate by using the transition metal compound of Chemical Formula 1 as a catalytically active component. In addition, the copolymer prepared by controlling the hydrogen input has a narrow molecular weight distribution with the optimized 1-butene content, thereby ensuring excellent fiber processability and reducing modulus in the preparation of nonwoven fabrics. Thus, high-strength high-softness nonwoven fabrics may be produced effectively.

Subsequently, in the method for preparing the propylene copolymer resin composition according to an embodiment of the present disclosure, the second step is a step of mixing the propylene-1-butene random copolymer prepared in the first step with a propylene-ethylene copolymer.

The propylene-ethylene copolymer is the same as described above, and it may contain 12 to 18 wt % of ethylene based on a total weight of the copolymer.

In addition, the propylene-1-butene random copolymer and propylene-ethylene copolymer may be mixed in a weight ratio as described above, and the mixing process may be carried out according to a conventional method.

As described above, the propylene copolymer resin composition prepared by the above-described method may have improved mechanical properties, in particular, the tensile strength and flexural modulus with a good balance, while exhibiting a low melting point and a narrow molecular weight distribution. Thus, softness may be improved while maintaining excellent strength properties in the preparation of nonwoven fabrics, especially spunbond nonwoven fabrics.

Therefore, according to another embodiment of the present disclosure, there is provided a nonwoven fabric, specifically a spunbond or melt blown nonwoven fabric, prepared using the propylene-butene copolymer resin composition as described above.

The spunbond nonwoven fabric may be prepared by a melt spun process characterized in that the propylene copolymer resin composition is melted and extruded with a microfiber web, and the melt blown nonwoven fabric may be prepared by a melt blown process.

More specifically, the spunbond nonwoven fabric according to an embodiment of the present disclosure optimizes the melting point, storage modulus and phase angle of the propylene copolymer resin composition to reduce modulus, thereby maintaining high strength and providing soft touch or softness compared to the conventional nonwoven fabric.

Specifically, the spunbond nonwoven fabric may have a tensile strength in a machine direction (MD) of 1400 gf or more and 2000 gf or less, and in a cross direction (CD) of 650 gf or more and 800 gf or less, when measured in accordance with ASTM D-5035 under a basis weight condition of 14 to 16 $g/m^2$.

In addition, total hand of handle-O-meter in a machine direction (MD) of the nonwoven fabric may be 5.0 g or less, and in a cross direction (CD) of the nonwoven fabric may be 3.0 g or less, in terms of securing excellent softness. When the total hand of handle-O-meter is maintained within the above-described range, it is possible to have excellent softness so that the spunbond nonwoven fabric can reduce roughness and have excellent soft properties. The handle-O-meter is measured when a basis weight of the nonwoven fabric is 14 to 16 $g/m^2$.

In particular, the spunbond nonwoven fabric according to an embodiment of the present disclosure is characterized by satisfying both the total hand of handle-O-meter and the tensile strength described above, thereby maintaining high strength and softness than conventional products.

Hereinafter, preferred examples will be described in order to facilitate understanding of the present invention. However, these examples are provided to facilitate understanding of the present invention, and the invention is not intended to be limited thereto.

Preparation Example 1: Preparation of Supported Catalyst

Step 1) Preparation of (diethylsilane-diyl)-bis(2-methyl-4-(4-tert-butyl-phenyl)indenyl)silane 2-methyl-4-(4-tert-butyl-phenyl)indene (20.0 g) was dissolved in a mixed solution of toluene/THF (10/1 by volume, 220 mL), and then n-butyllithium solution (2.5 M, hexane solvent, 22.2 g) was slowly added dropwise at 0° C., followed by stirring at room temperature for one day. Thereafter, diethyldichlorosilane (6.2 g) was slowly added dropwise to the mixed solution at −78° C. and stirred for about 10 minutes, followed by stirring at room temperature for one day. Thereafter, water was added to separate the organic layer, and then the solvent was distilled off under reduced pressure to obtain (diethylsilane-diyl)-bis(2-methyl-4-(4-tert-butyl-phenyl)indenyl)silane.

Step 2) Preparation of [(diethylsilane-diyl)-bis(2-methyl-4-(4-tert-butyl-phenyl)indenyl)]zirconium Dichloride The (diethylsilane-diyl)-bis(2-methyl-4-(4-tert-butyl-phenyl)indenyl)silane prepared in step 1 was dissolved in a mixed solution of toluene/THF (5/1 by volume, 120 mL), and n-butyllithium solution (2.5 M, hexane solvent, 22.2 g) was added dropwise at −78° C., followed by stirring at room temperature for one day. Zirconium chloride (8.9 g) was diluted in toluene (20 mL), and slowly added dropwise to the reaction solution at −78° C., followed by stirring at room temperature for one day. After the solvent in the reaction solution was removed under reduced pressure, dichloromethane was added thereto and filtered, and the filtrate was distilled off under reduced pressure. Recrystallization with toluene and hexane gave high-purity rac-[(diethylsilane-diyl)-bis(2-methyl-4-(4-tert-butyl-phenyl)indenyl)]zirconium dichloride (10.1 g, 34%, rac:meso=20:1).

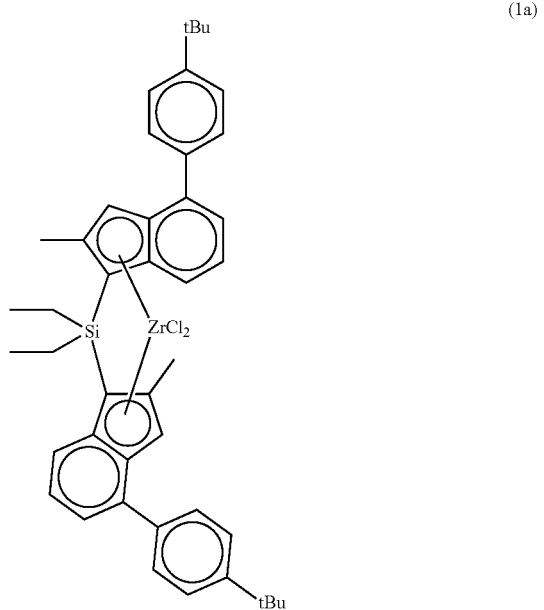

(1a)

Step 3) Preparation of Supported Catalyst

After weighing 3 g of silica in a schlenk flask in advance, 52 mmol of methylaluminoxane (MAO) was added thereto and reacted at 90° C. for 24 hours. When the precipitation was completed after the reaction, the upper layer was removed and washed twice with toluene. 240 μmol of the ansa-metallocene compound (1a) prepared in step 2 was dissolved in toluene, added to the reactor, and reacted at 70° C. for 5 hours. When the precipitation was completed after the reaction, the upper layer was removed. Then, the remaining reaction product was washed with toluene, washed again with hexane, and dried under vacuum to obtain 5 g of a silica-supported metallocene catalyst in the form of solid particles.

Preparation Example 2: Preparation of Supported Catalyst

Step 1) Preparation of (1,1-methyl-n-propylsilane-diyl)-bis(2-methyl-4-(4-tert-butyl-phenyl)indenyl) silane 2-methyl-4-(4-tert-butyl-phenyl)indene (10.0 g) was dissolved in a mixed solution of toluene/THF (10/1 by volume, 150 mL), and then n-butyllithium solution (2.5 M, hexane solvent, 11.1 g) was slowly added dropwise at 0° C., followed by stirring at room temperature for one day. Thereafter, 1,1-methyl-n-propyldichlorosilane (3.1 g) was slowly added dropwise to the mixed solution at −78° C. and stirred for about 10 minutes, followed by stirring at room temperature for one day. Thereafter, water was added to separate the organic layer, and then the solvent was distilled off under reduced pressure to obtain (1,1-methyl-n-propyl-silanediyl)-bis(2-methyl-4-(4-tert-butyl-phenyl)indenyl)silane.

Step 2) Preparation of [(1,1-methyl-n-propylsilane-diyl)-bis(2-methyl-4-(4-tert-butyl-phenyl)indenyl)] zirconium Dichloride The (1,1-methyl-n-propylsilanediyl)-bis(2-methyl-4-(4-tert-butyl-phenyl)indenyl)silane prepared in step 1 was dissolved in a mixed solution of toluene/THF (5/1 by volume, 100 mL), and n-butyllithium solution (2.5 M, hexane solvent, 11.1 g) was added dropwise at −78° C., followed by stirring at room temperature for one day. Zirconium chloride (4.5 g) was diluted in toluene (15 mL), and slowly added dropwise to the reaction solution at −78° C., followed by stirring at room temperature for one day. After the solvent in the reaction solution was removed under reduced pressure, dichloromethane was added thereto and filtered, and the filtrate was distilled off under reduced pressure. Recrystallization with toluene and hexane gave high-purity rac-[(1, 1-methyl-n-propylsilane-diyl)-bis(2-methyl-4-(4-tert-butyl-phenyl)indenyl)]zirconium dichloride (6.1 g, 41%, rac:meso=17:1, 1b).

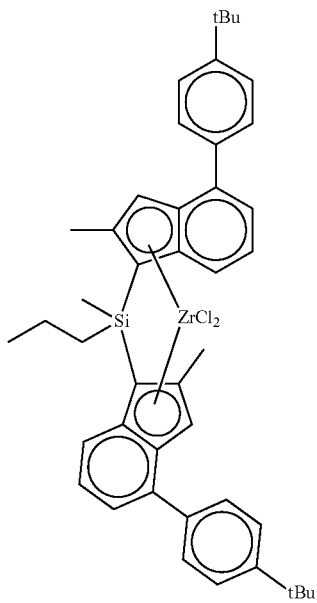

(1b)

Step 3) Preparation of Supported Catalyst

After weighing 3 g of silica in a schlenk flask in advance, 52 mmol of methylaluminoxane (MAO) was added thereto and reacted at 90° C. for 24 hours. When the precipitation was completed after the reaction, the upper layer was removed and washed twice with toluene. 240 μmol of the ansa-metallocene compound (1b) prepared in step 2 was dissolved in toluene, added to the reactor, and reacted at 70° C. for 5 hours. When the precipitation was completed after the reaction, the upper layer was removed. Then, the remaining reaction product was washed with toluene, washed again with hexane, and dried under vacuum to obtain 5 g of a silica-supported metallocene catalyst in the form of solid particles.

Comparative Preparation Example 1: Preparation of Supported Catalyst

A silica-supported metallocene catalyst was prepared in the same manner as in Step 3 of Preparation Example 1, except that an ansa-metallocene compound (I) having the following structure was used instead of the transition metal compound prepared in Step 2 of Preparation Example 1.

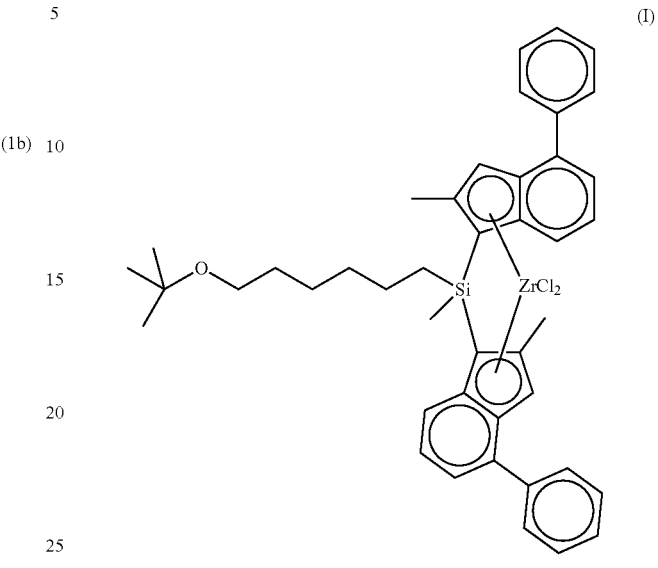

(I)

Example 1-1: Preparation of Propylene-1-Butene Random Copolymer

A propylene-butene copolymer (C4-random copolymer) was prepared according to a continuous bulk slurry polymerization process by adjusting the propylene content, the 1-butene content, polymerization conditions, etc., as shown in Table 1 below.

Specifically, a 2 L stainless reactor was vacuum dried at about 65° C. and then cooled, and triethylaluminum, hydrogen, 1-butene and propylene were sequentially added thereto in the contents shown in Table 1 below at room temperature. After stirring for about 10 minutes, 0.048 g of the silica-supported metallocene catalyst prepared in Preparation Example 1 was dissolved in about 20 mL of hexane having trimethylaluminum (TMA), and added into the reactor by nitrogen pressure. After the reactor temperature was slowly raised to about 70° C., polymerization was performed for about 1 hour. After the completion of the reaction, unreacted propylene and 1-butene were ventilated and dried.

Examples 1-2 to 1-6: Preparation of Propylene-1-Butene Random Copolymer

A propylene-1-butene random copolymer (C4-random copolymer) was obtained in the same manner as in Example 1-1, except that the polymerization conditions were changed as shown in Table 1 below.

Comparative Examples 1-1 to 1-3: Preparation of Propylene-1-Butene Random Copolymer Propylene-1-butene random copolymers (C4-random copolymer) of Comparative Examples 1-1 to 1-3 were obtained in the same manner as in Example 1-1, except that the catalyst of Comparative Preparation Example 1 was used instead of the catalyst of Preparation Example 1, and the hydrogen input was changed as shown in Table 1 below to prepare a resin having MI similar to that of Examples 1 to 3 even with the different catalyst.

Comparative Examples 1-4 to 1-5: Preparation of Propylene-1-Butene Random Copolymer A propylene-1-butene random copolymer (C4-random copolymer) was obtained in the same manner as in Example 1-1, except that the hydrogen input and 1-butene input were changed as shown in Table 1 below.

Comparative Example 1-6: Preparation of Propylene-1-Butene Random Copolymer

A propylene-1-butene random copolymer (C4-random copolymer) was obtained in the same manner as in Example 1-1, except that less than 100 ppm of hydrogen was introduced during the polymerization reaction.

Comparative Example 1-7: Preparation of Propylene-1-Butene Random Copolymer

A propylene-1-butene random copolymer (C4-random copolymer) was obtained in the same manner as in Example 1-1, except that less than 700 ppm of hydrogen was introduced during the polymerization reaction.

Experimental Example 1: Evaluation of Propylene-1-Butene Random Copolymer

Physical properties of the propylene-1-butene random copolymers prepared in Examples and Comparative Examples were evaluated. The results are shown in Tables 1 and 2 below.

(1) Yield (g): A weight of the prepared propylene-1-butene random copolymer was measured.

(2) 1-butene (C4) content (wt %): According to ASTM D 5576, the polymer prepared in one of Examples and Comparative Examples was prepared in the form of a film or film specimen, and then fixed on a magnetic holder of an FT-IR instrument. Next, an IR absorption spectrum analysis was performed to measure and calculate a height of 4800-3500 $cm^{-1}$ peak related to the specimen thickness and an area of 790-660 $cm^{-1}$ peak where 1-butene component appears. Thereafter, the 1-butene content was calculated by substituting the values measured above into a calibration equation which is obtained by plotting values obtained by dividing an area of 790-660 $cm^{-1}$ peak by a height of 4800-3500 $cm^{-1}$ peak of a standard sample according to ASTM D 5576.

(3) Melt index (MI, g/10 min): It was measured at 230° C. under a load of 2.16 kg in accordance with ASTM D1238, and expressed as the weight (g) of the polymer that has been melted for 10 minutes.

(4) Melting point (Tm, ° C.): The temperature of the copolymer was increased to 200° C., and maintained at that temperature for 5 minutes. After that, the temperature was lowered to 30° C., and further increased. The temperature at the top of the DSC (Differential Scanning calorimeter, manufactured by TA) curve was referred to as the melting point. Herein, the temperature was increased and lowered at a rate of 10° C./min, respectively, and the melting point was confirmed at the second heating period.

(5) Molecular weight distribution (MWD): The molecular weight distribution (MWD) was determined by measuring the weight average molecular weight (Mw) and the number average molecular weight (Mn) of the copolymer using gel permeation chromatography (GPC), and then dividing the weight average molecular weight by the number average molecular weight Specifically, it was measured using a Polymer Laboratories PLgel MIX-B 300 mm long column and PL-GPC220 instrument manufactured by Waters. At this time, a measurement temperature was 160° C., and 1,2,4-trichlorobenzene was used for a solvent at a flow rate of 1 mL/min. And the copolymer sample prepared in one of Examples and Comparative Examples was supplied with a concentration of 10 mg/10 mL in an amount of 200 μL.

Mw and Mn were obtained using a calibration curve formed using a polystyrene standard. 9 kinds of the polystyrene standard were used with the molecular weight of 2,000 g/mol, 10,000 g/mol, 30,000 g/mol, 70,000 g/mol, 200,000 g/mol, 700,000 g/mol, 2,000,000 g/mol, 4,000,000 g/mol, and 10,000,000 g/mol.

(6) Storage modulus (G'@25° C., Mpa): The initial storage modulus of the copolymer was measured using an ARES rheometer manufactured by TA Instruments (New Castle, Delaway, USA).

A sample for measurement was prepared to have a gap of 2.0 mm using parallel plates having a diameter of 25.0 mm at 190° C. The measurement was performed at 25° C. in the dynamic strain frequency sweep mode, at a 5% stain and a frequency ranged from 0.05 rad/s to 500 rad/s, a total of 41 points, 10 points in each decade. And a storage modulus at 0.05 rad/s was measured. Herein, the power law fitting was performed using TA Orchestrator, a measuring program.

(67) Phase angle (@Tg, °): Loss modulus (E") and storage modulus (E') were measured under the following conditions using TA RSA G2 as a dynamic mechanical analyzer (DMA), and the phase angle was calculated by a ratio of loss modulus (E")/storage modulus (E').

Measuring conditions: Strain 0.1%, Frequency 1 Hz, temperature increasing rate 5° C./min Specifically, an injection specimen of width 12.7 mm, thickness 3.2 mm, and length 40 mm or more was subjected to repeated deformation under the conditions of frequency 1 Hz and strain 0.1% while increasing the temperature from −30° C. to 150° C. at 5° C./min using 3 Point Bending Geometry, and a change in E" and E' was measured.

TABLE 1

| | | Examples | | | | | | Comparative Examples | | | | | | |
|---|---|---|---|---|---|---|---|---|---|---|---|---|---|---|
| | | 1-1 | 1-2 | 1-3 | 1-4 | 1-5 | 1-6 | 1-1 | 1-2 | 1-3 | 1-4 | 1-5 | 1-6 | 1-7 |
| Preparation conditions | Catalyst | Prep. Ex. 1 | Prep. Ex. 1 | Prep. Ex. 1 | Prep. Ex. 1 | Prep. Ex. 2 | Prep. Ex. 2 | Comp. Prep. Ex. 1 | Comp. Prep. Ex. 1 | Comp. Prep. Ex. 1 | Prep. Ex. 1 | Prep. Ex. 1 | Prep. Ex. 1 | Prep. Ex. 1 |
| | Amount of catalyst (mg) | 30 | 30 | 30 | 30 | 30 | 30 | 30 | 30 | 30 | 30 | 30 | 30 | 30 |

TABLE 1-continued

|  |  | Examples | | | | | | Comparative Examples | | | | | | |
| --- | --- | --- | --- | --- | --- | --- | --- | --- | --- | --- | --- | --- | --- | --- |
|  |  | 1-1 | 1-2 | 1-3 | 1-4 | 1-5 | 1-6 | 1-1 | 1-2 | 1-3 | 1-4 | 1-5 | 1-6 | 1-7 |
|  | Polymerization temp. (° C.) | 70 | 70 | 70 | 65 | 70 | 70 | 70 | 70 | 70 | 70 | 70 | 70 | 70 |
|  | Pressure (bar) | 35 | 35 | 35 | 35 | 35 | 35 | 35 | 35 | 35 | 35 | 35 | 35 | 35 |
|  | Hydrogen inpput (ppm) | 300 | 400 | 500 | 480 | 310 | 450 | 350 | 450 | 550 | 400 | 390 | 100 | 700 |
|  | Propylene C3 input (g) | 770 | 770 | 770 | 770 | 770 | 770 | 770 | 770 | 770 | 770 | 770 | 770 | 770 |
|  | 1-butene (C4) input (g) | 15 | 15 | 15 | 15 | 15 | 15 | 15 | 15 | 15 | 2 | 50 | 15 | 15 |
|  | TEAL input (1M, ml) | 3 | 3 | 3 | 3 | 3 | 3 | 3 | 3 | 3 | 3 | 3 | 3 | 3 |
| Copolymer evaluation | Yield(g) | 380 | 390 | 420 | 395 | 310 | 375 | 280 | 270 | 305 | 370 | 385 | 350 | 450 |
|  | C4 content (wt %) | 2.39 | 2.48 | 2.53 | 2.48 | 2.33 | 2.51 | 2.32 | 2.71 | 2.51 | 0.28 | 7.12 | 2.30 | 2.38 |
|  | MI (g/10 min) | 15 | 25 | 32 | 35 | 27 | 38 | 14 | 25 | 31 | 24 | 27 | 7 | 80 |
|  | Tm(° C.) | 143 | 141 | 142 | 141 | 142 | 142 | 140 | 139 | 141 | 151 | 119 | 144 | 141 |
|  | MWD | 2.3 | 2.2 | 2.1 | 2.1 | 2.2 | 2.2 | 2.9 | 2.8 | 2.8 | 2.4 | 2.2 | 2.2 | 2.2 |
|  | Storage modulus (Mpa) | 1,190 | 1,020 | 900 | 885 | 1,105 | 995 | 1,510 | 1,330 | 1,250 | 1,090 | 1,280 | 1,450 | 650 |
|  | Phase angle (@Tg, °) | 6.12 | 5.89 | 7.52 | 7.58 | 6.01 | 6.81 | 4.33 | 5.19 | 6.04 | 7.11 | 5.24 | 3.31 | 8.91 |

The propylene-1-butene random copolymers of Examples 1-1 to 1-6 prepared according to the present disclosure had a low storage modulus of 1200 Mpa or less and an optimized phase angle at the glass transition temperature of 5.5° to 8°, with a significantly narrow MWD of 2.3 or less.

On the other hand, the copolymers of Comparative Examples 1-1 to 1-3 using a catalyst having a different structure from that of Example had a C4 content equivalent to that of the copolymer of Example, but showed a high MWD of more than 2.4. In addition, they showed a high storage modulus and a low phase angle compared to those of Example, although the storage modulus and the phase angle were changed according to the increase in the hydrogen input in the polymerization reaction. From this, it can be seen that the copolymers of Comparative Examples 1-1 to 1-3 exhibited deteriorated fiber processability compared to Examples.

In addition, Comparative Examples 1-4 and 1-5, which use the same catalyst but do not satisfy the mixing ratio of 1-butene in the monomer, do not meet the condition of the C4 content in the prepared copolymer. In particular, it can be seen that Comparative Example 1-4 had poor fiber processability due to the excessively low C4 content. In addition, it can be seen that Comparative Example 1-5 had a high C4 content, greatly lowered Tm, and a small phase angle, so that it is difficult to prepare a flexible fiber and nonwoven fabric due to the decrease in processability and softness.

In addition, in the case of Comparative Example 1-6 in which hydrogen was added in an excessively small amount during the polymerization reaction for preparing the propylene-1-butene random copolymer, the melt index of the copolymer was greatly decreased, the storage modulus was greatly increased to 1450 MPa, and the phase angle was greatly reduced to 3.31°. From this, it can be seen that processability and softness were greatly reduced, so that it is difficult to prepare flexible fibers and nonwoven fabrics.

In addition, in the case of Comparative Example 1-7 in which hydrogen was added in an excessively high amount during the polymerization reaction for preparing the propylene-1-butene random copolymer, the melt index was greatly increased to 80 g/10 min, and the phase angle was greatly increased to 8.91°. From this, it can be seen that not only it is difficult to prepare flexible fibers and nonwoven fabrics, but there is also a high possibility that tearing occurs due to a large decrease in strength in the preparation of nonwoven fabrics.

Example 2-1: Preparation of Propylene Copolymer Resin Composition

A propylene copolymer resin composition was prepared by mixing the propylene-1-butene random copolymer prepared in Example 1-1 with a propylene-ethylene random copolymer (C3-POE[1], Vistamaxx™6202, manufactured by Exxon, C2 content=15 wt %) under the conditions shown in Table 2 below.

Examples 2-2 and 2-3: Preparation of Propylene Copolymer Resin Composition

A propylene copolymer resin composition was prepared in the same manner as in Example 2-1, except that the mixing ratio of the propylene-1-butene random copolymer and the propylene-ethylene random copolymer (C3-POE[1]) was changed as shown in Table 2 below.

Example 2-4: Preparation of Propylene Copolymer Resin Composition

A propylene copolymer resin composition was prepared in the same manner as in Example 2-2, except that the propylene-1-butene random copolymer prepared in Example 1-4 was used.

Example 2-5: Preparation of Propylene Copolymer Resin Composition

A propylene copolymer resin composition was prepared in the same manner as in Example 2-2, except that the propylene-1-butene random copolymer prepared in Example 1-5 was used.

Example 2-6: Preparation of Propylene Copolymer Resin Composition

A propylene copolymer resin composition was prepared in the same manner as in Example 2-2, except that a propylene-ethylene block copolymer (C3-POE$^2$) having a C2 content of 12 wt % in the copolymer was used as the propylene-ethylene copolymer.

Example 2-7: Preparation of Propylene Copolymer Resin Composition

A propylene copolymer resin composition was prepared in the same manner as in Example 2-2, except that a propylene-ethylene block copolymer (C3-POE$^3$) having a C2 content of 18 wt % in the copolymer was used as the propylene-ethylene copolymer.

Comparative Example 2-1: Preparation of Propylene Copolymer Resin Composition A commercially available H7700™ (manufactured by LG Chemical, MI=34 g/10 min) was used as the homo polypropylene prepared using a Ziegler-Natta catalyst (Homo-Z/N-PP).

Comparative Examples 2-2 to 2-4: Preparation of Propylene Copolymer Resin Composition A propylene copolymer resin composition was prepared in the same manner as in Example 2-1, except for using the Z/N homo polypropylene of Comparative Example 2-1 instead of the propylene-1-butene random copolymer and mixing with a propylene-ethylene random copolymer (C3-POE$^1$, Vistamaxx™6202, manufactured by Exxon, C2 content=15 wt %) under the conditions shown in Table 3 below.

Comparative Example 2-5: Preparation of Propylene Copolymer Resin Composition The propylene-1-butene random copolymer prepared in Example 1-1 was used alone.

Comparative Example 2-6: Preparation of Propylene Copolymer Resin Composition A propylene copolymer resin composition was prepared in the same manner as in Example 2-2, except that a propylene-ethylene random copolymer (C3-POE$^4$) having a C2 content of 4 wt % in the copolymer was used as the propylene-ethylene copolymer under the conditions shown in Table 3 below.

Comparative Example 2-7: Preparation of Propylene Copolymer Resin Composition A propylene copolymer resin composition was prepared in the same manner as in Example 2-1, except that a propylene-ethylene random copolymer (C3-POE$^1$) having a C2 content of 15 wt % in the copolymer was used as the propylene-ethylene copolymer under the conditions shown in Table 3 below.

Comparative Example 2-8: Preparation of Propylene Copolymer Resin Composition A propylene copolymer resin composition was prepared in the same manner as in Example 2-2, except for using the propylene-1-butene random copolymer prepared in Comparative Example 1-3 as the propylene-1-butene random copolymer.

Comparative Example 2-9: Preparation of Propylene Copolymer Resin Composition A propylene copolymer resin composition was prepared in the same manner as in Example 2-2, except for using the propylene-1-butene random copolymer prepared in Comparative Example 1-7 as the propylene-1-butene random copolymer.

Comparative Example 2-10: Preparation of Propylene Copolymer Resin Composition A propylene copolymer resin composition was prepared in the same manner as in Example 2-2, except for using the propylene-1-butene random copolymer prepared in Comparative Example 1-4 as the propylene-1-butene random copolymer.

Comparative Example 2-11: Preparation of Propylene Copolymer Resin Composition A propylene copolymer resin composition was prepared in the same manner as in Example 2-2, except for using the propylene-1-butene random copolymer prepared in Comparative Example 1-5 as the propylene-1-butene random copolymer.

Comparative Example 2-12: Preparation of Propylene Copolymer Resin Composition A propylene copolymer resin composition was prepared in the same manner as in Example 2-2, except for using the propylene-1-butene random copolymer prepared in Comparative Example 1-6 as the propylene-1-butene random copolymer.

Comparative Example 2-13: Preparation of Propylene Copolymer Resin Composition A propylene copolymer resin composition was prepared in the same manner as in Example 2-2, except that a propylene-ethylene block copolymer (C3-POE$^5$) having a C2 content of 20 wt % in the copolymer was used as the propylene-ethylene copolymer under the conditions shown in Table 3 below.

Experimental Example 2: Evaluation of Physical Properties of Resin Composition Physical properties of the propylene copolymer resin compositions prepared in Examples and Comparative Examples were evaluated in the following manner, and the results are shown in Tables 2 and 3 below.

(1) Melting point (Tm, ° C.): It was measured using DSC in the same manner as in the copolymer.

(2) Molecular weight distribution (MWD): It was measured in the same manner as in the copolymer by measuring Mw and Mn using GPC, and then calculating a ratio of Mw/Mn.

(3) Tensile strength ($kg/cm^2$): After forming a film using the resin composition prepared in one of Examples and Comparative Examples under the following conditions, the tensile strength was measured according to ASTM D882.

<Film Forming Conditions>
Screw rpm: 40 rpm
Processing temperature: 170° C.
Die gap: 2.5 mm
Dies: 100 mm (4) Flexural modulus ($kg/cm^2$): After the specimen prepared in accordance with ASTM D790 was fixed to a support, the strength required when a load is applied at approximately 30 to 50 mm/min by loading nose was measured. The flexural modulus indicating stiffness was measured by an initial slope value according to the flexural strength, a maximum value at which the loading nose no longer increases, and the flexural force.

TABLE 2

| | | Examples | | | | | | |
|---|---|---|---|---|---|---|---|---|
| | | 2-1 | 2-2 | 2-3 | 2-4 | 2-5 | 2-6 | 2-7 |
| Composition of resin composition (wt %) | C4-random PP | Ex. 1-1 | Ex. 1-1 | Ex.1-1 | Ex.1-4 | Ex. 1-5 | Ex. 1-1 | Ex. 1-1 |
| | C4-random PP content | 95 | 90 | 85 | 90 | 90 | 90 | 90 |
| | C3-POE[1] | 5 | 10 | 15 | 10 | 10 | — | — |
| | C3-POE[2] | — | — | — | — | — | 10 | — |
| | C3-POE[3] | — | — | — | — | — | — | 10 |
| Physical properties of resin composition | Tm (° C.) | 144 | 144 | 143 | 144 | 143 | 143 | 141 |
| | MWD | 2.1 | 2.1 | 2.1 | 2.2 | 2.3 | 2.2 | 2.1 |
| | Tensile strength ($kg/cm^2$) | 284 | 259 | 238 | 261 | 252 | 273 | 233 |
| | Flexural modulus ($kg/cm^2$) | 11,100 | 10,200 | 9,400 | 10,500 | 9,900 | 10,800 | 9,400 |

TABLE 3

| | | Comparative Examples | | | | | | | | | | | | |
|---|---|---|---|---|---|---|---|---|---|---|---|---|---|---|
| | | 2-1 | 2-2 | 2-3 | 2-4 | 2-5 | 2-6 | 2-7 | 2-8 | 2-9 | 2-10 | 2-11 | 2-12 | 2-13 |
| Composition of resin composition (wt %) | C4-random PP | — | — | — | — | Ex. 1-1 | Ex. 1-1 | Ex. 1-1 | Comp. Ex. 1-3 | Comp. Ex. 1-7 | Comp. Ex. 1-4 | Comp. Ex. 1-5 | Comp. Ex. 1-6 | Ex. 1-1 |
| | C4-random PP content | — | — | — | — | 100 | 90 | 70 | 90 | 90 | 90 | 90 | 90 | 90 |
| | homo-Z/N-PP* | 100 | 95 | 90 | 85 | — | — | — | — | — | — | — | — | — |
| | C3-POE[1] | — | 5 | 10 | 15 | — | — | 30 | 10 | 10 | 10 | 10 | 10 | — |
| | C3-POE[4] | — | — | — | — | — | 10 | — | — | — | — | — | — | — |
| | C3-POE[5] | — | — | — | — | — | — | — | — | — | — | — | — | 10 |
| Physical properties of resin composition | Tm (° C.) | 160 | 160 | 161 | 161 | 143 | 143 | 144 | 141 | 143 | 148 | 119 | 144 | 143 |
| | MWD | 2.5 | 2.8 | 2.9 | 2.9 | 2.1 | 2.6 | 3.0 | 2.9 | 2.2 | 2.3 | 2.3 | 2.4 | 2.2 |
| | Tensile strength ($kg/cm^2$) | 326 | 303 | 281 | 258 | 291 | 198 | 186 | 279 | 185 | 295 | 201 | 276 | 230 |
| | Flexural modulus ($kg/cm^2$) | 15,000 | 13,100 | 10,900 | 9,100 | 12,800 | 8,800 | 8,400 | 13,100 | 8,700 | 12,050 | 8,000 | 11,700 | 8,500 |

In Tables 2 and 3, homo-Z/N-PP*: H7700™ (MI=34 g/10 min) manufactured by LG chemical, C3-POE[1]: a propylene-ethylene random copolymer having a C2 content of 15 wt %, C3-POE[2]: a propylene-ethylene block copolymer having a C2 content of 12 wt %, C3-POE[3]: a propylene-ethylene block copolymer having a C2 content of 18 wt %, C3-POE[4]: a propylene-ethylene random copolymer having a C2 content of 4 wt %, C3-POE[5]: a propylene-ethylene block copolymer having a C2 content of 20 wt %.

The propylene copolymer resin compositions of Examples 2-1 to 2-7 had a narrow molecular weight distribution of 2.4 or less with a low melting point of 150° C. or less, and exhibited a flexural modulus of 9,000 to 12,000 kg/cm$^2$ with a tensile strength of 100 to 300 kg/cm$^2$. From this, it can be seen that the prepared nonwoven fabric could exhibit more excellent softness by improving the total hand with excellent stretchability and strength.

On the other hand, the resin composition of Comparative Example 2-1 using homo polypropylene prepared using a conventional Ziegler-Natta catalyst alone instead of the propylene-1-butene random copolymer had too high tensile strength and flexural modulus with a high melting point, thereby lowering processability. Thus, it can be seen that it is difficult to prepare soft fibers and nonwoven fibers.

In the case of Comparative Examples 2-2 to 2-4 in which the propylene-ethylene polymer was further mixed with the homo polypropylene prepared using a Ziegler-Natta catalyst, the tensile strength and flexural modulus decreased with the increase in the mixing ratio of the propylene-ethylene polymer. However, the resin compositions exhibited a high melting point and a wide molecular weight distribution, thereby degrading fiber processability.

The resin composition of Comparative Example 2-5 including the propylene-1-butene random copolymer prepared in Example 1-1 alone had a lower melting point and a narrower molecular weight distribution, compared to those of Comparative Examples 2-1 to 2-4 including the homo polypropylene prepared using a Ziegler-Natta catalyst. However, the tensile strength and flexural modulus were higher than those of Examples.

In addition, in the case of Comparative Example 2-6 including a propylene-ethylene polymer together with the propylene-1-butene random copolymer prepared in Example 1-1 but not meeting the ethylene content in the propylene-ethylene polymer, and Comparative Example 2-7 including a propylene-ethylene polymer satisfying the C2 content together with the propylene-1-butene random copolymer prepared in Example 1-1 but not meeting the mixing ratio, the molecular weight distribution was increased and the tensile strength and flexural modulus were greatly decreased compared to Examples.

In addition, in the case of Comparative Examples 2-8 to 2-10 including a propylene-ethylene polymer satisfying the $C_2$ content together with the propylene-1-butene random copolymer at an optimum mixing ratio, but not satisfying physical property requirements of the propylene-1-butene random copolymer, the resin compositions also had a decrease in strength during the preparation of nonwoven fabrics or an increase in total hand compared to Examples, resulting in poor softness. Specifically, in the case of the resin composition of Comparative Example 2-8 including the propylene-1-butene random copolymer of Comparative Example 1-3 having a wide molecular weight distribution and not meeting the storage modulus condition, processability was lowered by the wide molecular weight distribution, and strength at the time of preparing nonwoven fabrics was lowered due to the high storage modulus exceeding 1200 MPa, thus the nonwoven fabrics were easily torn. In addition, in the case of the resin composition of Comparative Example 2-9 including the propylene-1-butene random copolymer of Comparative Example 1-7 having the high MI of the first resin (MI=80 g/10 min) and exceeding the phase angle condition, the tensile strength was greatly reduced, and there was a difficulty in applying it to the nonwoven fabric due to the decrease in flexural property. The nonwoven fabric thus prepared was also easily torn due to the reduced strength. In addition, in the case of Comparative Example 2-10 including the propylene-1-butene random copolymer of Comparative Example 1-4 satisfying both the storage modulus and the phase angle conditions but not meeting the 1-butene content in the copolymer, the resin composition was excellent in tensile strength of the nonwoven fabric, but it turned out that softness of the nonwoven fabric was reduced due to the decrease in flexural property.

From these results, it can be seen that the physical property requirements of the propylene-1-butene random copolymer, the ethylene content in the propylene-ethylene copolymer, and the mixing ratio of the propylene-1-butene random copolymer and the propylene-ethylene copolymer should be satisfied at the same time in order to improve the resin composition according to the present disclosure.

Examples 3-1 to 3-3 and Comparative Examples 3-1 to 3-7: Preparation of Spunbond Nonwoven Fabric The propylene copolymer resin compositions prepared in Examples 2-1 to 2-3 and Comparative Examples 2-1 to 2-7 were used as raw materials, and a spunbond/spunbond double laminated nonwoven fabric (ss nonwoven fabric) was prepared by performing spunbond-melt blown-melt blown-spunbond in sequence.

Specifically, a masterbatch was prepared using 98 wt % of the resin composition prepared in one of Examples 2-1 to 2-3 and Comparative Examples 2-1 to 2-7 and 2 wt % of cis-13-docosenoamide (manufactured by Sigma-Aldrich) as a softener with a 25 mm twin-screw extruder, and pelletized. Subsequently, masterbatch pellets were extruded with a microfiber web by a process similar to that described in the disclosure [Report No. 4364 of the Naval Research Laboratories, published May 25, 1954 entitled "Manufacture of Superfine Organic Fibers" by Wente, Van. A. Boone, C. D. and Fluharty, E. L.], except that the molten masterbatch composition was fed to a melt pump (65 rpm) with a 31 mm Brabender conical twin screw extruder, and then fed to a 25 cm melt spun die having outlets (10 outlets/cm) with an outlet diameter of 381 μm.

The melting temperature was 235° C., the screw speed was 120 rpm, the die was maintained at 235° C., the primary air temperature and pressure were 300° C. and 60 kPa (8.7 psi), respectively, the processing speed of the polymer was 5.44 kg/hr and the collector/die distance was 15.2 cm.

Experimental Example 3: Evaluation of Physical Properties of Spunbond Nonwoven Fabric Physical properties of the spunbond nonwoven fabrics prepared in Examples and Comparative Examples were evaluated, and the results are shown in Table 4 below.

(1) Basis Weight of Nonwoven Fabric (gsm, g/m²)

A weight of the nonwoven fabric extruded with a microfiber web was measured, and a weight of the nonwoven fabric per unit area was calculated.

(2) Evaluation of Total Hand

Total hand (softness, g) of the nonwoven fabric was measured in a machine direction (MD) and in a cross direction (CD) under a basis weight (g/m²) condition of Table 4 using a handle-O-meter instrument manufactured by Thwing-Albert Instrument. Herein, the total hand of handle-O-meter has an error of ±25%, a deviation known from the manufacturer.

(3) Evaluation of Strength

Tensile strength (gf) was measured in a machine direction (MD) and in a cross direction (CD) under a basis weight (g/m²) condition of Table 4 using Universal Testing Systems (UTM) manufactured by Instron in accordance with a cut-strip method of ASTM D-5035.

TABLE 4

|  | Examples | | | Comparative Examples | | | | | | |
| --- | --- | --- | --- | --- | --- | --- | --- | --- | --- | --- |
|  | 3-1 | 3-2 | 3-3 | 3-1 | 3-2 | 3-3 | 3-4 | 3-5 | 3-6 | 3-7 |
| Propylene copolymer resin composition | Ex. 2-1 | Ex. 2-2 | Ex. 2-3 | Comp. Ex. 2-1 | Comp. Ex. 2-2 | Comp. Ex. 2-3 | Comp. Ex. 2-4 | Comp. Ex. 2-5 | Comp. Ex. 2-6 | Comp. Ex. 2-7 |
| Basis weight of nonwoven fabric (g/m²) | 15.2 | 15.1 | 14.8 | 15.0 | 14.8 | 15.2 | 15.1 | 14.9 | 13.9 | 15.5 |
| Tensile strength (MD, gf) | 1,820 | 1,550 | 1,420 | 2,815 | 2,250 | 1,890 | 1,450 | 2,030 | 1,115 | 1,190 |
| Tensile strength (CD, gf) | 780 | 715 | 650 | 1,450 | 980 | 805 | 630 | 820 | 480 | 510 |
| Total hand (MD, g) | 4.9 | 4.4 | 3.8 | 5.7 | 11.0 | 9.1 | 7.5 | 5.3 | 3.9 | 3.2 |
| Total hand (CD, g) | 2.8 | 2.7 | 2.3 | 2.1 | 6.9 | 6.0 | 4.7 | 3.3 | 1.9 | 2.0 |

As a result of the experiment, the spunbond nonwoven fabrics of Examples 3-1 to 3-3 prepared using the resin compositions according to the present disclosure had a tensile strength in MD of 1400 to 2000 gf and a tensile strength in CD of 650 to 800 gf under a basis weight condition of 14 to 16 g/m² due to the excellent fiber processability of the resin composition. In addition, they had the handle-O-meter in MD of 5.0 g or less and the handle-O-meter in CD of 3.0 g or less, thereby exhibiting greatly increased softness with excellent strength properties.

The invention claimed is:

1. A propylene copolymer resin composition comprising:
   a propylene-1-butene random copolymer satisfying the following conditions (i) to (iv);
   (i) 1-butene content of 1 to 5 wt % in the propylene-1-butene random copolymer,
   (ii) molecular weight distribution of 2.4 or less,
   (iii) storage modulus of 1200 MPa or less at 25° C., and
   (iv) phase angle of 5.5° to 8° at a glass transition temperature, and
   a propylene-ethylene copolymer having an ethylene content of 12 to 18 wt % in the propylene-ethylene copolymer;
   wherein a weight ratio of the propylene-1-butene random copolymer to the propylene-ethylene copolymer is 80:20 to 99:1.

2. The propylene copolymer resin composition of claim 1, wherein the propylene-1-butene random copolymer has a melt index of 10 to 40 g/10 min, measured at 230° C. under a load of 2.16 kg in accordance with ASTM D1238.

3. The propylene copolymer resin composition of claim 1, wherein the propylene-1-butene random copolymer has a melting point of 140 to 150° C.

4. The propylene copolymer resin composition of claim 1, wherein the propylene-ethylene copolymer is a block copolymer.

5. The propylene copolymer resin composition of claim 1, wherein the propylene copolymer resin composition has a melting point of 150° C. or less and a molecular weight distribution of 2.3 or less.

6. The propylene copolymer resin composition of claim 1, wherein the propylene copolymer resin composition has a tensile strength of 100 to 300 kg/cm² measured in accordance with ASTM D882, and a flexural modulus of 9,000 to 12,000 kg/cm² measured in accordance with ASTM D790.

7. A method for preparing the propylene copolymer resin composition of claim 1, comprising:
   polymerizing propylene and 1-butene in a weight ratio of 99:1 to 95:5 while introducing 300 to 500 ppm of hydrogen in the presence of a catalyst comprising a transition metal compound represented by following Chemical Formula 1 to prepare the propylene-1-butene random copolymer satisfying the following conditions (i) to (iv); and
   mixing the propylene-1-butene random copolymer and the propylene-ethylene copolymer having the ethylene content of 12 to 18 wt % in the propylene-ethylene copolymer,
   wherein a weight ratio of the propylene-1-butene random copolymer to the propylene-ethylene copolymer is 80:20 to 99:1, (i) 1-butene content of 1 to 5 wt % in the propylene-1-butene random copolymer, (ii) molecular weight distribution of 2.4 or less, (iii) storage modulus of 1200 MPa or less at 25° C., and (iv) phase angle of 5.5° to 8° at a glass transition temperature,

[Chemical Formula 1]

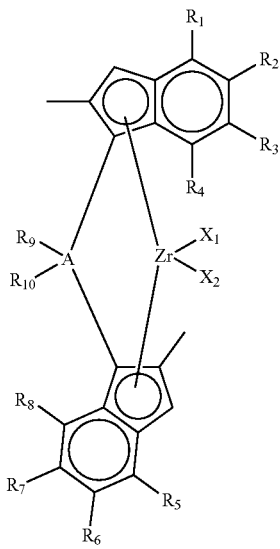

wherein in Chemical Formula 1, A is carbon, silicon or germanium, $X_1$ and $X_2$ are each independently halogen, $R_1$ and $R_5$ are each independently $C_{6-20}$ aryl substituted with $C_{1-20}$ alkyl, $R_2$ to $R_4$ and $R_6$ to $R_8$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl, $R_9$ is $C_{1-20}$ alkyl, and $R_{10}$ is $C_{2-20}$ alkyl.

8. The method for preparing the propylene copolymer resin composition of claim 7, wherein A is silicon, $R_1$ and $R_5$ are each independently phenyl group substituted with a $C_{3-6}$ branched alkyl group, and $R_9$ and $R_{10}$ are the same as each other, a $C_{2-4}$ linear alkyl group; or $R_9$ is a $C_{1-2}$ alkyl group and $R_{10}$ is a $C_{3-10}$ linear alkyl group.

9. The method for preparing the propylene copolymer resin composition of claim 7, wherein the transition metal compound of Chemical Formula 1 is a compound represented by following Chemical Formula 1a or 1b:

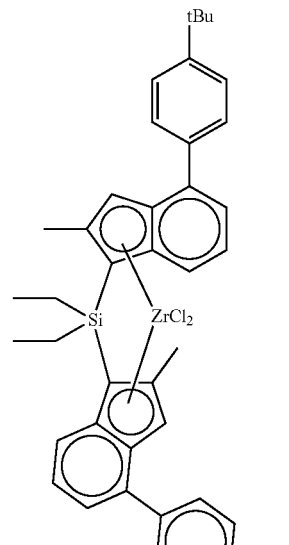

(1a)

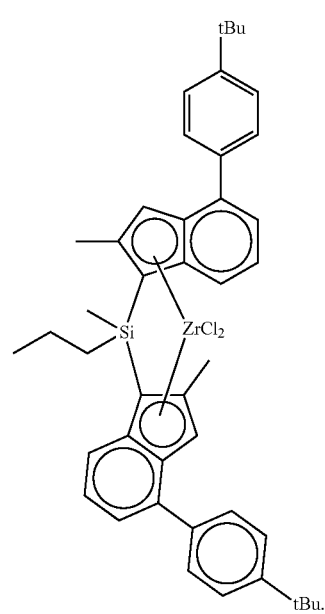

(1b)

10. The method for preparing the propylene copolymer resin composition of claim 7, wherein the catalyst further comprises a silica support.

11. The method for preparing the propylene copolymer resin composition of claim 7, wherein the catalyst further comprises at least one cocatalyst selected from the compound represented by the following Chemical Formula 2, the compound represented by the Chemical Formula 3 or the compound represented by the Chemical Formula 4:

$$—[Al(R_{11})—O]_m—$$ [Chemical Formula 2]

wherein in Chemical Formula 2, $R_{11}$ are the same as or different from each other, and each independently halogen; a $C_{1-20}$ hydrocarbon; or a halogen-substituted $C_{1-20}$ hydrocarbon; and m is an integer of 2 or more;

$$J(R_{12})_3$$ [Chemical Formula 3]

wherein in Chemical Formula 3, $R_{12}$ are the same as or different from each other, and each independently halogen; a $C_{1-20}$ hydrocarbon; or a halogen-substituted $C_{1-20}$ hydrocarbon; and J is aluminum or boron;

$$[E-H]^+[ZD_4]^- \text{ or } [E]^+[ZD_4]^- \qquad \text{[Chemical Formula 4]}$$

wherein in Chemical Formula 4, E is a neutral or cationic Lewis base;

H is a hydrogen atom;

Z is a Group 13 element; and

D are the same as or different from each other, and each independently a $C_{6-20}$ aryl or $C_{1-20}$ alkyl group, of which one or more hydrogen atoms are substituted or unsubstituted with halogen, a $C_{1-20}$ hydrocarbon, alkoxy, or phenoxy.

12. The method for preparing the propylene copolymer resin composition of claim 7, wherein the polymerization is carried out by a continuous bulk-slurry polymerization process.

13. The method for preparing the propylene copolymer resin composition of claim 7, wherein trialkylaluminum is further added during the polymerization.

14. A nonwoven fabric prepared using the propylene copolymer resin composition of claim 1.

15. The nonwoven fabric of claim 14, wherein the nonwoven fabric is a spunbond or melt blown nonwoven fabric.

* * * * *